March 14, 1944.   H. H. CLAYTON   2,344,129
AUTOMATIC SWITCH FOR COMPARTMENT LIGHTS
Filed Nov. 28, 1941

Inventor.
Harold H. Clayton.
By Brown, Jackson, Boettcher & Dienner
Attys.

Patented Mar. 14, 1944

2,344,129

UNITED STATES PATENT OFFICE 2,344,129

AUTOMATIC SWITCH FOR COMPARTMENT LIGHTS

Harold H. Clayton, Logansport, Ind., assignor to R-B-M Manufacturing Company, Logansport, Ind., a corporation of Indiana Application November 28, 1941, Serial No. 420,780

6 Claims. (Cl. 200—52)

The present invention relates to automatic gravity operated switch means suitable for controlling a lamp lighting the storage compartment of an automobile and the like.

The advantage of this device is its simplicity, inexpensiveness and durability. The structure is composed almost exclusively of pieces that may be formed as stampings, which permits of saving in time, material and costs and also permits of rapid assembly. Furthermore since there are no solid relatively movable parts there is no opportunity for friction to cause wear and consequent failure to operate.

The switch is adapted for use not only in rear compartments of automobiles but also in glove compartments in automobile dash boards, in closets and other storage spaces where it is advantageous to have a lamp lighted upon opening a door or panel to the space. Thus it has a wide variety of uses.

The switch is compact for the parts are small and relatively stationary and no space is needed for moving elements within the switch. This compactness and its sturdiness make my device especially desirable in automobiles where space is always at a premium and where a switch is subjected to much motion and vibration.

These and further advantages will appear as I describe, in conjunction with the accompanying drawing, the construction and operation of a particular embodiment of my invention.

Figure 1:
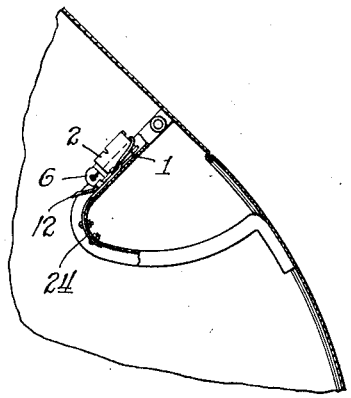
Figure 1 is a sectional view of a luggage carrying compartment of an automobile, when the space is closed, showing the position of the lamp and switch in "off" position.
Figure 2:
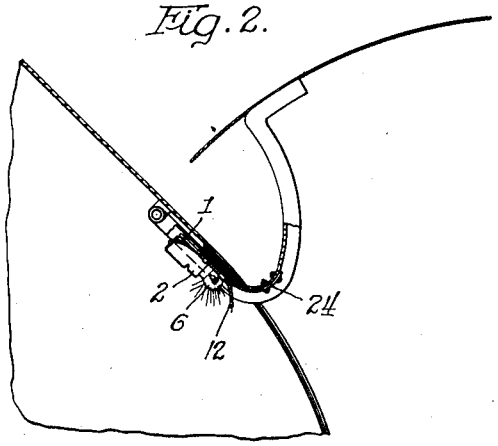
Figure 2 is a sectional view of the carrying compartment when the door to the space is opened and the switch and lamp are in "on" position.

Referring to Figures 1 and 2 first, there may be seen one example of the use to which my invention can be put. The lamp 6 in Figure 1 does not automatically light up until the door to which it is fastened is raised to "open" position as shown in Figure 2.

Figure 4:
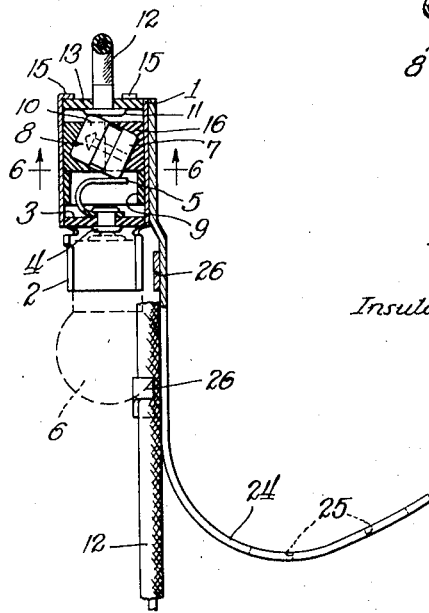
Figure 4 is a sectional view of the switch and socket taken along the line 4—4 of Figure 3.
Figure 3:
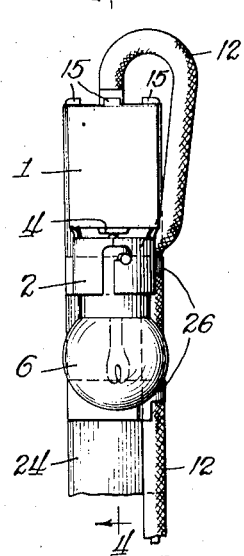
Figure 3 is an elevational view of the switch, socket and lamp assembly.

Considering next Figures 3 and 4, reference numeral 1 indicates a rectangular metal casing one end of which comprises a circular lamp socket 2 of the bayonet type. At the base of the socket 2 there is a washer 3 formed of insulation in rectangular shape so that said washer cannot pass through the circular lamp socket 2. A centrally located rivet 4 in the washer 3 serves to contact the central terminal of the lamp 6 when the lamp is inserted in the socket. This rivet 4 also serves to fasten to the opposite side of the washer 3 a generally U-shaped spring 5. The spring 5 has two functions, namely, to continue the electrical circuit from the lamp through the rivet 4 and also to bias the remaining elements of the device in a direction away from the socket 2. This spring action keeps all the elements of the electrical circuit in firm contact with each other. For example, the spring 5 contacts one metallic cap 7 of the mercury switch 8 and aids in pressing the other metallic cap 10 against the contact point 11 of the hot conductor 12. Another rectangular plate of insulation 13 carries the end of the hot conductor 12 and the contact point 11. Plate 13 is pressed by the contact point 11 against the fingers 15 which are formed integrally with the casing 1. While the lamp 6 is being inserted in the socket 2 the central contact of the lamp forces the washer 3 away from the socket. This compresses the spring 5. But in order to prevent undue compression of spring 5 which might damage it, an insulating spacing tube 9 is placed between the washer 3 and a split block of insulation 16. When the bayonets on the lamp base have been inserted and turned to their final locking position the washer 3 returns to its original position where it firmly presses contact point 4 against the center contact of the lamp 6.

Figure 6:
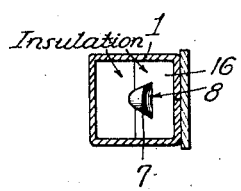
Figure 6 is a sectional view taken along the line 6—6 of Figure 4.

The switch 8 is a mercury switch and is set at an angle to the axis of the casing 1 by enclosure in a split block 16 of insulation. The block 16 is composed of two identical portions which, when fitted together about the mercury switch 8, have a rectangular cross section equal to the inside cross sectional area of the casing. (See Figure 6.) The advantage of setting switch 8 in the block 16 at an angle with the longitudinal axis of the casing resides in the fact that it provides a definite point or short line contact where the corners of its caps 10 and 7 abut against the contact 11 and spring 5 respectively. Spring 5 presses these points of contact firmly together. A point or short line contact under pressure provides a much better path for the flow of electricity than other kinds of contact. If, on the other hand, the flat ends of caps 10 and 7 were used to make electrical contact with contact 11 and spring 5 respectively, the current path would offer more resistance since the pressure (force per unit area of contact produced by spring 5) would be less. There would also be a trouble from corrosion where contact is not made firmly. Continuing corrosion might force the cap and contact apart.

Figure 5:
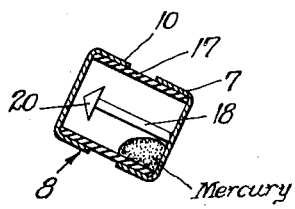
Figure 5 is an enlarged section through the mercury switch.

Referring more specifically now to Figure 5, we can see the construction of the mercury switch 8. A tube of insulating material 17 has its upper and lower ends closed by metallic caps 10 and 7 respectively to produce a unitary closed structure. To the inside of cap 7 is spot welded the base of pin 18 and around the base of pin 18 is a small pool of mercury. When the switch is tilted by opening a door or panel to which the switch is fastened, the mercury, by force of gravity, runs to the opposite end of the tube 17. That is—the mercury contacts the inside surface of metal cap 10 and also engulfs the tip 20 of the pin 18. That results in the completion of an electrical circuit through the switch as follows: from the metallic cap 7, through the pin 18 and its head 20, thence through the mercury to metallic cap 10. The electrical circuit of the whole unit can then be seen to be the following: Current from the hot conductor 12 flows through the contact point 11 and through the switch 8, when it is in activated position, through the U-shaped spring 5 and the central contact point 4, thence through the lamp filament of the lamp 6 and from there to the lamp's side contact with the socket 2, and then to ground.

The bracket 24 is fastened to the side of the casing 1, as by spot welding, and is so formed as to hold the unit in non-active ("off") position when the closure element to which it is bolted is shut (see Figure 1) and to position it in "on" position when the closure element is in opened position (see Figure 2). The shape of the bracket 24 varies depending upon where it is used and should always be such that when the closure element is opened, the mercury in switch 8 will flow by force of gravity to a position contacting the metallic cap 10 and the pin 18 thus completing the circuit through the switch 8. Throughout this whole switch and socket unit there is only one moving part, and that is the mercury in switch 8. The bracket 24 carries bolt holes 25 and clips 26. The clips are spot welded to the bracket and are adapted to act as guides for the conductor 12 while the bolt holes 25 permit the whole lamp assembly to be bolted to a desired closure element.

While I have shown and described above the preferred structure in which the principles of the present invention have been embodied, it is to be understood that my invention is not to be limited to the specific details shown and described, but that, in fact, other and different means may be employed in the practice of the broader aspects of my invention.

Therefore, what I claim and desire to secure by Letters Patent is:

1. In combination, a casing, insulatingly borne electrical contacts at either end of said casing, and a unitary enclosed gravity operated switch unit having metallic caps at its ends and being insulatingly supported with its longitudinal axis at an angle to the longitudinal axis of the casing to permit a corner of each of said caps to be held in point or short line contact with said electrical contacts.

2. A gravity actuated automatic lighting means comprising, in combination, a metallic casing forming a lamp socket at one end and bearing within itself a pair of electrical contacts insulated from said casing, one contact being adjacent the lamp socket for engaging an adjacent lamp terminal and the other contact being at the opposite end of the casing for connection to a conductor, a U-shaped conducting spring element one arm of which is supported by one of said electrical contacts, and a switch unit within said casing having terminals at its opposite ends disposed eccentrically of said casing and insulated therefrom, said spring conducting means urging the terminals of said switch unit into engagement with said contacts, and said switch unit having gravity responsive means for establishing a circuit between its terminals when said casing is tilted.

3. A gravity actuated automatic lighting means comprising, in combination, a metallic casing forming a lamp socket at one end and bearing within itself two insulatingly borne electrical contacts, one adjacent the lamp socket for engaging an adjacent lamp terminal and the other at the opposite end of the casing for connection to a hot conductor, a U-shaped conducting spring element one arm of which is supported by the first mentioned electrical contact, and an insulatingly borne integral enclosed switch unit comprising a pair of terminals, one terminal being disposed laterally of the longitudinal axis of said casing and engaging the free arm of said U-shaped spring, and the other terminal engaging the second of said contacts, said integral switch unit having gravity responsive means for connecting the interior sides of its terminals when said casing is tilted, and a spacing tube set between the first insulatingly borne contact and said insulatingly borne integral switch unit to prevent excessive compression of said U-shaped spring, said conducting spring biasing said integral switch unit and second contact toward the end of the casing opposite the lamp socket and maintaining the elements of the circuit in firm contact.

4. A gravity actuated automatic lighting means comprising, in combination, a metallic casing forming a lamp socket at one end and bearing within itself two insulatingly borne electrical contacts, one adjacent the lamp socket for engaging an adjacent lamp terminal and the other at the opposite end of the casing for connection to a hot conductor, a U-shaped conducting spring element one arm of which is supported by the first mentioned electrical contact, and an integral enclosed unit insulatingly borne so that its longitudinal axis is at an angle with the longitudinal axis of the casing whereby the corner of one of its terminals engages the second of said contacts in line or point contact and the corner of the other terminal engages the free arm of the U-shaped spring in line or point contact, said integral switch unit having internal gravity responsive means for connecting its terminals when said casing is tilted, and said conducting spring biasing said switch unit and second contact toward the end of the casing opposite the lamp socket and maintaining firm line or point contact between the integral switch unit and the conducting elements which it contacts.

5. In combination, a housing, a pair of approximately parallel spaced apart contacts carried in insulated relation to each other in said housing, a cylindrical gravity switch unit having metallic circular terminals on its ends disposed in the housing with its cylindrical axis disposed at an angle to said contacts whereby engagement of limited area between said contacts and said circular terminals is ensured, and spring means for pressing said contacts and terminals firmly in engagement.

6. In combination, a housing, a pair of approximately parallel spaced apart contacts carried in insulated relation to each other in said housing, a cylindrical gravity switch unit having metallic circular terminals on its ends disposed in the housing with its cylindrical axis disposed at an angle to said contacts whereby engagement of limited area between said contacts and said circular terminals is ensured, spring means for pressing said contacts and terminals firmly in engagement, said spring means comprising a U-shaped spring one leg of which constitutes one of said contacts, and an insulating member guided in the housing attached to the other leg of said spring.

HAROLD H. CLAYTON.